US011996255B2

(12) United States Patent
Kuwahara et al.

(10) Patent No.: US 11,996,255 B2
(45) Date of Patent: May 28, 2024

(54) FUSE

(71) Applicant: SOC Corporation, Tokyo (JP)

(72) Inventors: Hidekazu Kuwahara, Tochigi (JP); Yuki Komiyama, Tochigi (JP)

(73) Assignee: SOC Corporation, Tokyo (JP)

( * ) Notice: Subject to any disclaimer, the term of this patent is extended or adjusted under 35 U.S.C. 154(b) by 43 days.

(21) Appl. No.: 18/074,519

(22) Filed: Dec. 5, 2022

(65) Prior Publication Data

US 2023/0097062 A1 Mar. 30, 2023

Related U.S. Application Data

(63) Continuation of application No. PCT/JP2021/008699, filed on Mar. 5, 2021.

(51) Int. Cl.

*H01H 85/175* (2006.01)
*H01H 85/10* (2006.01)
*H01H 85/17* (2006.01)
*H01H 85/18* (2006.01)
*H01H 85/041* (2006.01)

(52) U.S. Cl.

CPC ........ *H01H 85/1755* (2013.01); *H01H 85/10* (2013.01); *H01H 85/17* (2013.01); *H01H 85/18* (2013.01); *H01H 2085/0414* (2013.01)

(58) Field of Classification Search

CPC ....... H01H 85/10; H01H 85/165–1755; H01H 85/18; H01H 2085/0412–0414

See application file for complete search history.

(56) References Cited

U.S. PATENT DOCUMENTS 4,894,633 A * 1/1990 Holtfreter .......... H01H 85/0411 337/201
5,739,739 A 4/1998 Muramatsu et al.
2009/0309689 A1* 12/2009 Pavlovic ................ H01R 13/18 337/187

(Continued)

FOREIGN PATENT DOCUMENTS

CN 112992626 A * 6/2021 ............. H01H 85/05
JP 66123170 2/1986

(Continued)

OTHER PUBLICATIONS

Duan CN-112992626-A Machine Translation (Year: 2021).*

*Primary Examiner* — Jacob R Crum
(74) *Attorney, Agent, or Firm* — JCIPRNET

(57) ABSTRACT

A fuse includes a case member that has a rectangular parallelepiped shape and has a space, a lid member that closes an upper opening of the case member and closely adheres to the case member, a fuse-element disposed in the space, and a pair of terminals, whose distal ends are exposed to outside, connected to both ends of the fuse-element. The case member includes a plurality of first engaging projections formed on a first side wall, and a plurality of second engaging projections formed on a second side wall. The lid member includes a plurality of first engagement recesses formed in a first contact wall and fitted respectively to the plurality of first engaging projections, and a plurality of second engagement recesses formed in a second contact wall and fitted respectively to the plurality of second engaging projections.

11 Claims, 7 Drawing Sheets

(56) References Cited

U.S. PATENT DOCUMENTS

| | | | | |
|---|---|---|---|---|
| 2013/0009744 | A1 * | 1/2013 | Douglass | H01H 85/15<br>337/187 |
| 2013/0342305 | A1 | 12/2013 | Yen | |
| 2018/0151322 | A1 * | 5/2018 | Lin | H01H 85/56 |
| 2020/0006030 | A1 | 1/2020 | Yoneda | |

FOREIGN PATENT DOCUMENTS

| | | |
|---|---|---|
| JP | H01164647 | 11/1989 |
| JP | H0729807 | 6/1995 |
| JP | H0729812 | 6/1995 |
| JP | 2001093399 | 4/2001 |
| JP | 2003281986 | 10/2003 |
| JP | 5782196 | 9/2015 |
| JP | 2015195131 | 11/2015 |
| JP | 2019046767 | 3/2019 |
| WO | 2013063037 | 5/2013 |
| WO | 2017161558 | 9/2017 |

* cited by examiner

| | | CASE MEMBER | | | |
|---|---|---|---|---|---|
| | | A1 (LCP) | A2 (PPS) | A3 (PHENOL) | A4 (UNSATURATED POLYESTER) |
| LID MEMBER | B1 (LCP) | GOOD | GOOD | GOOD | GOOD |
| | B2 (PPS) | GOOD | GOOD | GOOD | GOOD |
| | B3 (PHENOL) | GOOD | GOOD | GOOD | GOOD |
| | B4 (UNSATURATED POLYESTER) | POOR | POOR | POOR | POOR |

| | | CASE MEMBER | | | |
|---|---|---|---|---|---|
| | | A1 (LCP) | A2 (PPS) | A3 (PHENOL) | A4 (UNSATURATED POLYESTER) |
| LID MEMBER | B1 (LCP) | POOR | POOR | POOR | POOR |
| | B2 (PPS) | POOR | POOR | POOR | POOR |
| | B3 (PHENOL) | POOR | POOR | GOOD | GOOD |

FUSE

CROSS-REFERENCE TO RELATED APPLICATIONS

The present application is a continuation application of International Application number PCT/JP2021/8699, filed on Mar. 5, 2021. The contents of these applications are incorporated herein by reference in their entirety.

BACKGROUND OF THE INVENTION

The present disclosure relates to a fuse.

Fuses are used to prevent the occurrence of circuit breakdown due to an inflow of overcurrent in an electronic device. A fuse has a fuse-element, and when an abnormal current flows in a circuit on which the fuse is mounted, the fuse-element melts and interrupts the current to prevent the circuit from being broken.

The fuse-element is disposed in a space surrounded by a case member and a lid member. Since the lid member may be detached from the case member when air pressure in this space increases, the lid member and the case member are thermally welded (see Japanese Patent No. 5782196).

However, when the lid member and the case member are thermally welded, the number of steps for manufacturing the fuse increases. Therefore, there is a demand to realize a fuse that can be easily assembled while maintaining breaking performance of the fuse.

BRIEF SUMMARY OF THE INVENTION

The present disclosure focuses on this point, and its object is to provide a fuse that satisfies both breaking performance and assemblability.

An aspect of the present disclosure provides a fuse including: a case member that has a rectangular parallelepiped shape and has a space surrounded by a bottom portion and side walls; a lid member that closes an upper opening of the case member and closely adheres to the case member; a fuse-element disposed in the space; and a pair of terminals, whose distal ends are exposed to outside, connected to respective ends of the fuse-element, wherein the case member includes a plurality of first projections formed on a first side wall extending in a longitudinal direction, and a plurality of second projections formed on a second side wall that opposes the first side wall, and the lid member includes a plurality of first recesses formed in a first contact wall in contact with the first side wall and fitted respectively to the plurality of first projections, a plurality of second recesses formed in a second contact wall in contact with the second side wall and fitted respectively to the plurality of second projections, distal end portions of the first contact wall and the second contact wall of the lid member bend outward while contacting the first projections and the second projections at the time of mounting the lid member to the case member, the case member has four corner recesses that are formed by having four corners of the case member recessed, and the lid member has four restricting parts that regulate positional deviation in the longitudinal direction of the first contact wall and the second contact wall and are guided by each of the corner recesses at the time of being mounted to the case member while bending, the restricting parts being disposed at respective ends of the first contact wall and the second contact wall, engageably with the corner recesses.

DETAILED DESCRIPTION OF EMBODIMENTS

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

First Embodiment (Configuration of a Fuse)

A configuration of a fuse according to a first embodiment will be described with reference to FIGS. 1 to 3.

Figure 1:
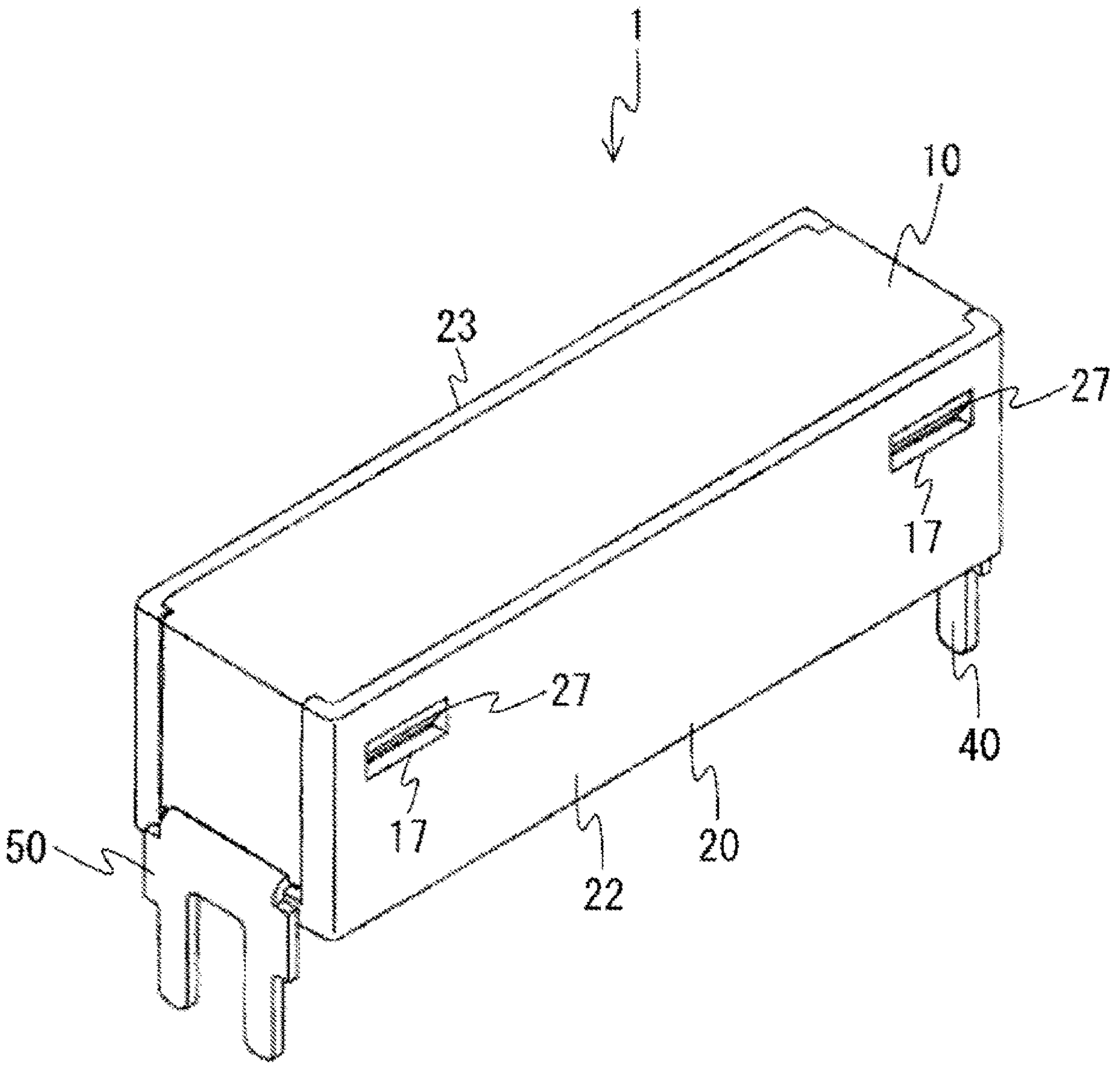
FIG. 1 is a perspective view showing a fuse 1 according to a first embodiment.

FIG. 1 is a perspective view showing a fuse 1 according to the first embodiment. FIG. 2 is an exploded perspective view of the fuse 1 according to the first embodiment. FIG. 3 is an internal configuration diagram of the fuse 1 according to the first embodiment. The fuse 1 shown in FIG. 3 is shown in a state where the fuse 1 shown in FIGS. 1 and 2 is turned upside down.

The fuse 1 is mounted on a circuit board of an electronic device or the like, and is operated when an abnormal current flows in the circuit. The fuse 1 is a small fuse whose height, width, and length are respectively 11 mm, 11 mm, and 40 mm or less, for example. The rated voltage of the fuse 1 is DC 500 V, and the rated current is 50 A or less. As shown in FIG. 2, the fuse 1 includes a case member 10, a lid member 20, a fuse-element 30, and a pair of terminals 40 and 50.

Figure 2:
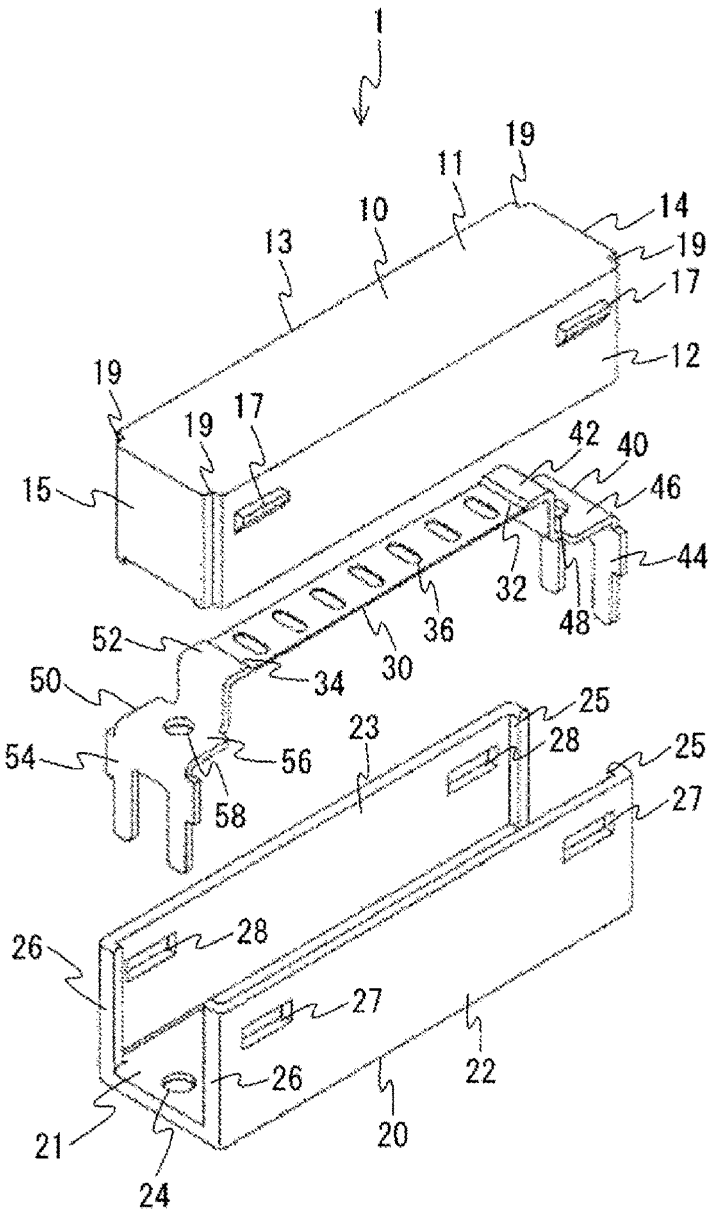
FIG. 2 is an exploded perspective view of the fuse 1 according to the first embodiment.
Figure 3:
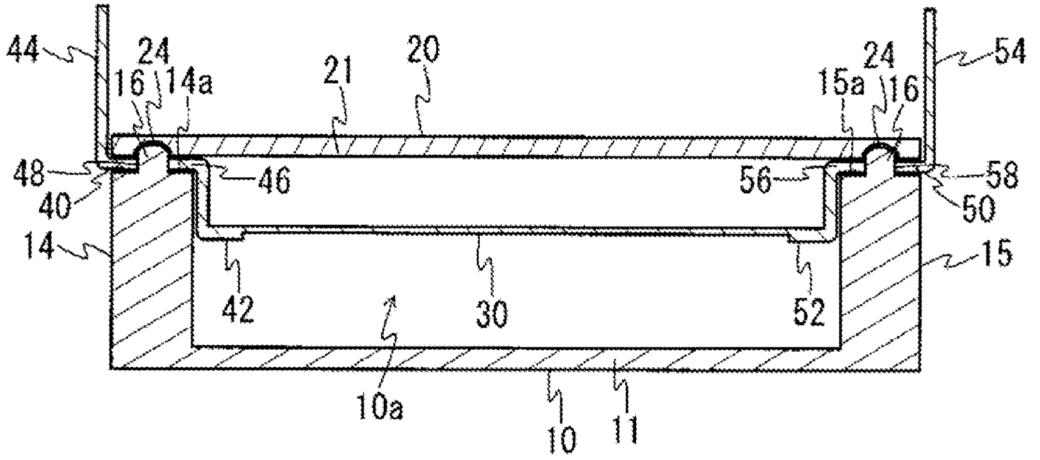
FIG. 3 is an internal configuration diagram of the fuse 1 according to the first embodiment.

The case member 10 has a rectangular parallelepiped shape with an opening at the top, as shown in FIG. 2. A space 10*a* surrounded by the walls is formed in the case member 10, and the fuse-element 30 is disposed in the space 10*a*, as shown in FIG. 3. The case member 10 is made of resin, and specifically, is made of phenol resin or unsaturated polyester resin.

Figure 4:
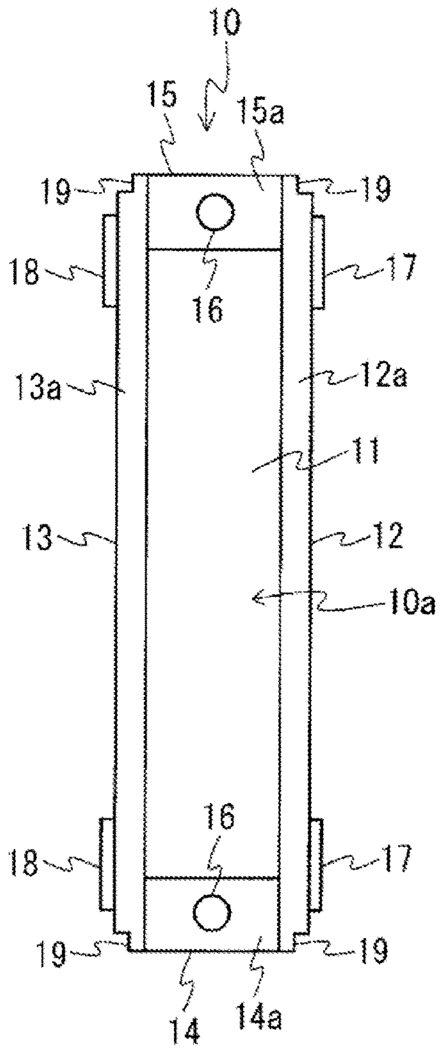
FIG. 4 is a planar view of a case member 10.
Figure 5:
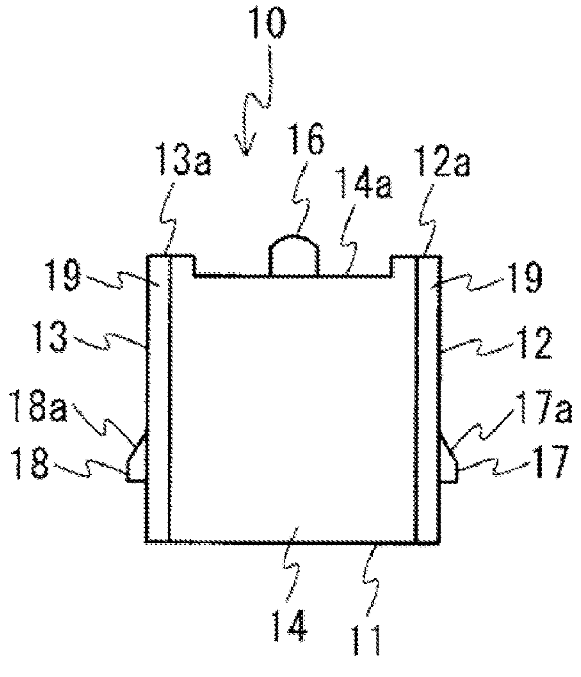
FIG. 5 is a side view of the case member 10.

FIG. 4 is a planar view of the case member 10. FIG. 5 is a side view of the case member 10. The case member 10 has a bottom portion 11, four side walls 12, 13, 14, and 15, pin parts 16, engaging projections 17 and 18, and corner recesses 19. The side wall 12 corresponds to a first side wall, the side wall 13 corresponds to a second side wall, the side wall 14 corresponds to a third side wall, and the side wall 15 corresponds to a fourth side wall. The engaging projection 17 corresponds to a first projection, and the engaging projection 18 corresponds to a second projection.

The bottom portion 11 is formed in a rectangular shape. The side walls 12, 13, 14, and 15 are formed to stand from four sides of the bottom portion 11. The side walls 12, 13, 14, and 15 and the bottom portion 11 surround the space 10*a*.

As shown in FIG. 2, the side walls 12 and 13 are walls that extend along the longitudinal direction of the case member 10. The side wall 13 opposes the side wall 12. An upper surface 12*a* (FIG. 4) of the side wall 12 and an upper surface 13*a* (FIG. 4) of the side wall 13 are in contact with the lid member 20.

The side walls 14 and 15 are walls that extend along the transverse direction of the case member 10. That is, the side walls 14 and 15 are orthogonal to the side walls 12 and 13. As shown in FIG. 3, an upper surface 14*a* of the side wall 14 is in contact with the terminal 40, and an upper surface 15*a* of the side wall 15 is in contact with the terminal 50. The upper surface 14*a* and the upper surface 15*a* are located at the same height, as shown in FIG. 5, but the upper surface 14*a* is lower than the upper surface 12*a* of the side wall 12 by the thickness of the terminal 40 and the upper surface 15*a* is lower than the upper surface 13*a* of the side wall 13 by the thickness of the terminal 50.

The pin parts 16 are respectively disposed on the upper surface 14*a* of the side wall 14 and the upper surface 15*a* of the side wall 15. The pin parts 16 are pins protruding from the center of the upper surface 14*a* and the upper surface 15*a*, respectively. As shown in FIG. 3, the pin parts 16 each fit into recessed parts 24 of the lid member 20 in a state in which the terminal 40 and the terminal 50 are inserted.

The engaging projection 17 is a projection that engages with the lid member 20 so that the case member 10 is adhered to the lid member 20. As shown in FIG. 4, a plurality of engaging projections 17 are formed on the side wall 12. Specifically, the engaging projections 17 are formed on the side wall 12 at both ends in the longitudinal direction and the bottom portion 11 side. However, the engaging projection 17 may also be formed at the center in the longitudinal direction and on the bottom portion 11 side. That is, three engaging projections 17 may be formed on the side wall 12.

As shown in FIG. 5, the engaging projection 17 includes an inclined portion 17*a*. The inclined portion 17*a* is inclined such that its height increases toward the bottom portion 11. Because such an inclined portion 17*a* is provided, the lid member 20 can easily ride over the engaging projection 17 since the side wall of the lid member 20 is deflected (expanded) along the inclined portion 17*a* at the time of mounting the lid member 20 to the case member 10. This makes it easier to mount the lid member 20 that adheres to the case member 10.

Similarly to the engaging projection 17, the engaging projection 18 is a projection that engages with the lid member 20 so that the case member 10 is adhered to the lid member 20. As shown in FIG. 4, a plurality of engaging projections 18 are formed on the side wall 13 that opposes the side wall 12. Specifically, the engaging projections 18 are formed on the side wall 13 at both ends in the longitudinal direction and on the bottom portion 11 side. However, the present disclosure is not limited thereto, and the engaging projection 18 may also be formed at the center in the longitudinal direction and on the bottom portion 11 side. That is, three engaging projections 18 may be formed on the side wall 13.

As shown in FIG. 5, the engaging projection 18 includes an inclined portion 18*a*. The inclined portion 18*a* is inclined such that its height increases toward the bottom portion 11. Because such an inclined portion 18*a* is provided, the lid member 20 can easily ride over the engaging projection 18 since the side wall of the lid member 20 is deflected (expanded) along the inclined portion 18*a* at the time of mounting the lid member 20 to the case member 10. This makes it easier to mount the lid member 20 that adheres to the case member 10.

The corner recesses 19 are four recessed corners of the case member 10. That is, as shown in FIG. 2, the corner recesses 19 are the recessed corners of four side walls 12, 13, 14, and 15. The corner recesses 19 have a function of positioning the lid member 20 with respect to the case member 10.

The lid member 20 is not fixed to the case member 10 by welding or the like, but is detachably mounted to the case member 10. As shown in FIG. 3, the lid member 20 closes an upper opening of the case member 10. The lid member 20 closely adheres to the case member 10. The lid member 20 is made of resin, specifically, phenol resin.

As shown in FIG. 2, the lid member 20 includes a flat plate portion 21, contact walls 22 and 23, the recessed parts 24, restricting parts 25 and 26, and engagement recesses 27 and 28. The contact wall 22 corresponds to a first contact wall, the contact wall 23 corresponds to a second contact wall, the engagement recess 27 corresponds to a first recess, and the engagement recess 28 corresponds to a second recess.

Figure 6:
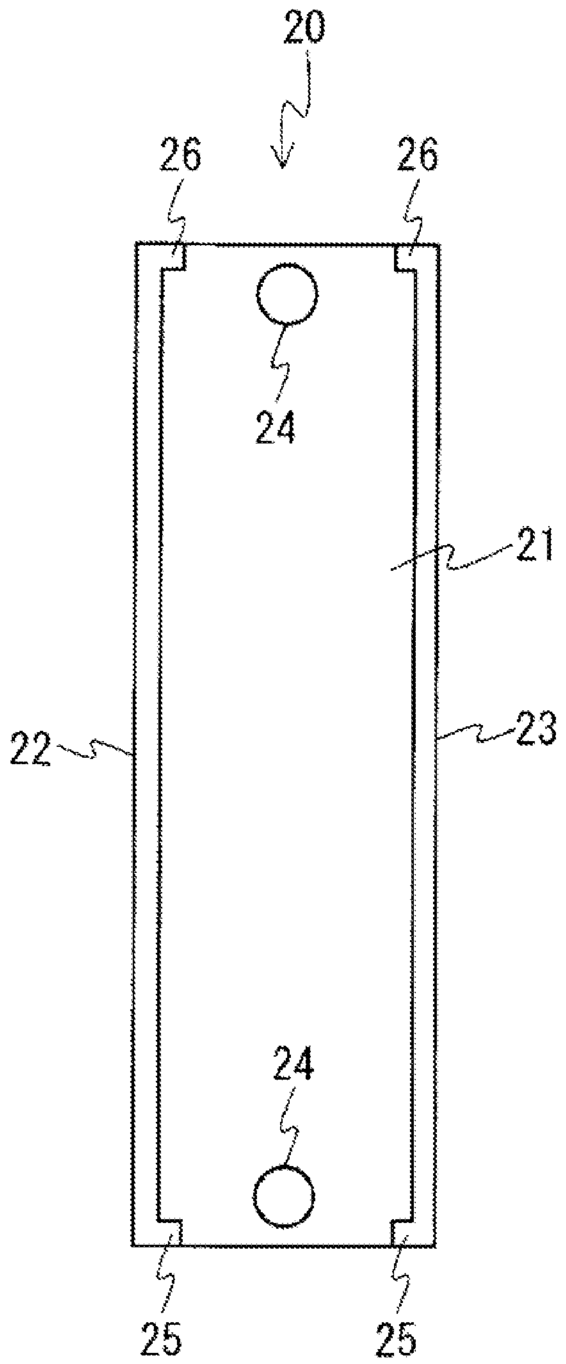
FIG. 6 illustrates a configuration of a lid member 20.

FIG. 6 illustrates a configuration of the lid member 20. The flat plate portion 21 has a rectangular shape and closes the upper opening of the case member 10. The flat plate portion 21 closes the upper opening of the case member 10 whereby the space 10*a* becomes a sealed space. As shown in FIG. 3, the flat plate portion 21 is spaced apart from the fuse-element 30 in the space 10*a* by a predetermined distance. Together with the case member 10, both ends of the flat plate portion 21 sandwich the terminals 40 and 50.

The contact wall 22 is a wall bent from the flat plate portion 21 and in contact with the side wall 12 of the case member 10. The contact wall 22 has substantially the same size as the side wall 12 and covers the entire side wall 12 (see FIG. 1). The contact wall 22 comes in surface contact with the entire side wall 12. Thus, the contact wall 22 closely adheres to the side wall 12.

The contact wall 23 is a wall bent from the flat plate portion 21 and in contact with the side wall 13 of the case member 10. The contact wall 23 has substantially the same size as the side wall 13, and covers the entire side wall 13 (see FIG. 1). The contact wall 23 comes in surface contact with the entire side wall 13. Thus, the contact wall 23 closely adheres to the side wall 13.

Two recessed parts 24 are disposed respectively at the ends of the flat plate portion 21 in the longitudinal direction. Two recessed parts 24 fit into the pin parts 16 respectively located at the ends of the case member 10 in the longitudinal direction. The lid member 20 is positioned with respect to the case member 10 by fitting the recessed parts 24 and the pin parts 16 together.

The restricting parts 25 and 26 regulate (in other words, to guide) the position of the lid member 20 when the lid member 20 is mounted to the case member 10. That is, since the restricting parts 25 and 26 are locked to the corner recesses 19 of the case member 10, positional deviation in the longitudinal direction at the time of mounting can be regulated. The restricting part 25 is a wall connected to first ends of the contact walls 22 and 23 in the longitudinal direction, and the restricting part 26 is a wall connected to second ends of the contact walls 22 and 23 in the longitudinal direction.

As shown in FIG. 1, the engagement recesses 27 and 28 are portions which the engaging projections 17 and 18 of the case member 10 engage with. Specifically, the engaging projection 17 is engaged with the engagement recess 27, and the engaging projection 18 is engaged with the engagement recess 28. Since the engagement recesses 27 and 28 are engaged with the engaging projections 17 and 18, even if air pressure in the space 10*a* increases, a state in which the engaging projections 17 and 18 are locked to the engagement recesses 27 and 28 is maintained, so that it is possible to prevent the lid member 20 from coming off the case member 10.

As shown in FIG. 2, a plurality of engagement recesses 27 are formed in the contact wall 22. The number of engagement recesses 27 is the same as the number of engaging projections 17, and is two in this embodiment. Two engagement recesses 27 respectively engage with two engaging projections 17. Two engagement recesses 27 are formed at two corner portions away from the flat plate portion 21, among the four corner portions of the contact wall 22. The engagement recesses 27 are through-hole portions passing through the contact wall 22. Specifically, the engagement recesses 27 have rectangular through-holes. However, the engagement recesses 27 are not limited thereto, and may have depressions, as long as the engagement recesses 27 can engage with the engaging projections 17.

As shown in FIG. 2, a plurality of engagement recesses 28 are formed in the contact wall 23. The number of the engagement recesses 28 is the same as the number of the engaging projections 18, and is two in this embodiment. Two engagement recesses 28 respectively engage with two engaging projections 18. Two engagement recesses 28 are formed at two corner portions away from the flat plate portion 21 among four corner portions of the contact wall 23. The engagement recesses 28 are through-hole portions passing through the contact wall 23. Specifically, the engagement recesses 28 have rectangular through-holes. However, the engagement recesses 28 are not limited to this, and may have depressions as long as the engagement recesses 28 can engage with the engaging projections 18.

Figure 7A:
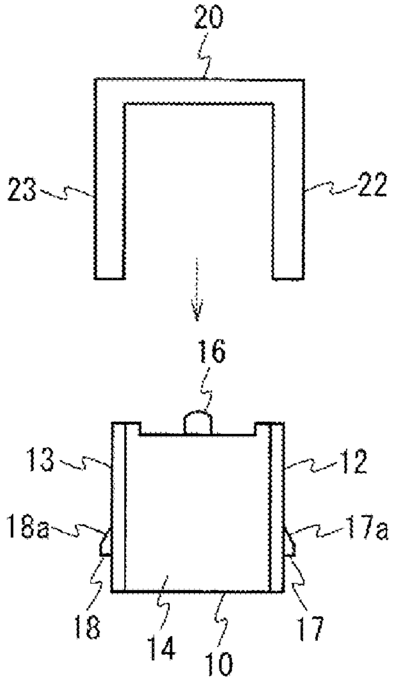
FIGS. 7A to 7D are each a schematic view for illustrating a flow of mounting the lid member 20 to the case member 10.
Figure 7B:
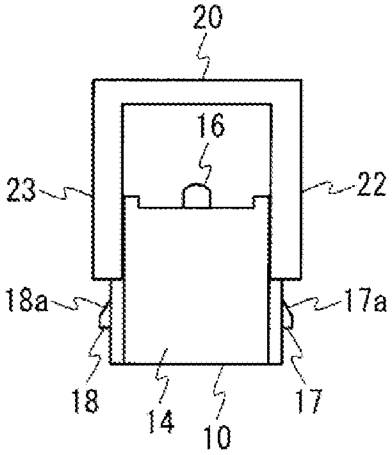
Figure 7C:
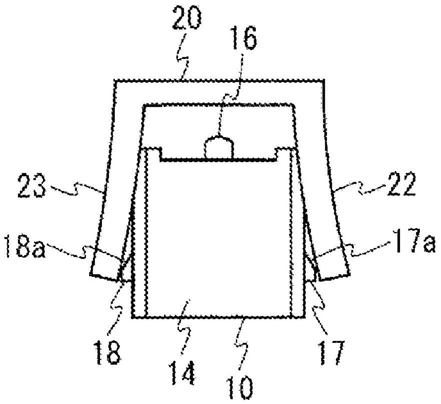
Figure 7D:
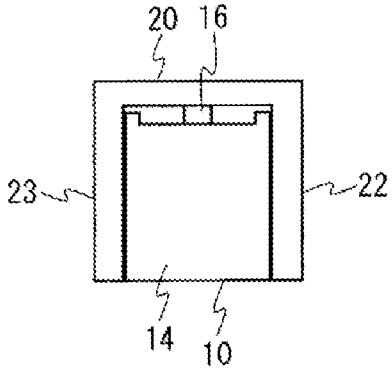

FIGS. 7A to 7D are each a schematic view for illustrating a flow of mounting the lid member 20 to the case member 10. In FIGS. 7A to 7D, as a matter of convenience, the fuse-element 30, the terminal 40, and the terminal 50 are omitted. Here, it is assumed that the lid member 20 is to be mounted to the case member 10 in the direction of the arrow shown in FIG. 7A. When the lid member 20 is mounted to the case member 10, distal end portions of the contact walls 22 and 23 of the lid member 20 contact the engaging projections 17 and 18 of the case member 10, as shown in FIG. 7B. Further, when the lid member 20 is moved down to the case member 10, the contact walls 22 and 23 ride on the inclined portions 17*a* and 18*a* while bending outward, as shown in FIG. 7C. At this time, since the four restricting parts 25 and 26 shown in FIG. 2 are respectively guided by the corner recesses 19, no positional deviation occurs in the longitudinal direction of the contact walls 22 and 23 that ride on the inclined portions 17*a* and 18*a* while bending. When the lid member 20 is moved further as shown in FIG. 7D, deflection of the contact walls 22 and 23 is gone, and the engaging projections 17 and 18 engage with the engagement recesses 27 and 28. By doing this, the lid member 20 is mounted such that the lid member 20 is closely adhered to the case member 10. Since no positional deviation occurs in the longitudinal direction of the contact walls 22 and 23 as described above, the engaging projections 17 and 18 and the engagement recesses 27 and 28 can be engaged appropriately.

As shown in FIG. 2, the fuse-element 30 is a plate-like fuse-element. The fuse-element 30 is disposed in the space 10*a* of the case member 10. Specifically, the fuse-element 30 is disposed such that the fuse-element 30 is aerially supported in the space 10*a* by the terminals 40 and 50. The thickness of the fuse-element 30 is less than the thickness of the terminals 40 and 50.

The fuse-element 30 is connected to the terminals 40 and 50. Specifically, a first end portion 32 in the longitudinal direction of the fuse-element 30 is connected to the terminal 40, and a second end portion 34 in the longitudinal direction of the fuse-element 30 is connected to the terminal 50. Here, the fuse-element 30 is formed integrally with the terminals 40 and 50. Due to this, the work of bonding the fuse-element 30 and the terminals 40 and 50 is not needed, and therefore an occurrence of bonding failure can be prevented. In addition, since there is no bonding resistance, the resistance value of the fuse 1 is stabilized.

A plurality of holes 36 formed at predetermined intervals are disposed in the fuse-element 30, as shown in FIG. 2. Here, each hole 36 is an elongated hole, but is not limited thereto. For example, each hole 36 may be a perfect circle.

As shown in FIG. 2, the terminals 40 and 50 are located at the ends of the fuse-element 30. The terminals 40 and 50 are connected to respective ends of the fuse-element 30, and are a pair of terminals whose distal ends are exposed to the outside, as shown in FIG. 1. The terminals 40 and 50 are external terminals to be connected to the circuit board. As shown in FIG. 3, the terminal 40 is sandwiched between the upper surface 14*a* of the side wall 14 of the case member 10 and the flat plate portion 21 of the lid member 20. The terminal 50 is sandwiched between the upper surface 15*a* of the side wall 15 of the case member 10 and the flat plate portion 21 of the lid member 20.

The terminal 40 is bent to take a step shape, as shown in FIG. 2, and includes a connecting portion 42, a bifurcated portion 44, a sandwiched portion 46, and a through-hole 48. The connecting portion 42 is located at one end of the terminal 40 and is connected to the first end portion 32 in the longitudinal direction of the fuse-element 30. The bifurcated portion 44 is a portion obtained by bifurcating the other end (distal end side) of the terminal 40. The bifurcated portion 44 is exposed from the case member 10 and is connected to the circuit board. The sandwiched portion 46 is located at the center of the terminal 40 and is sandwiched between the case member 10 and the lid member 20. Specifically, the sandwiched portion 46 is sandwiched between the upper surface 14*a* of the side wall 14 and the flat plate portion 21. As shown in FIG. 3, the through-hole 48 is a portion through which one of the pin parts 16 of the case member 10 is inserted. By inserting the pin part 16 through the through-hole 48, the fuse-element 30 connected to the terminal 40 is positioned with respect to the case member 10.

As shown in FIG. 2, the terminal 50 has a symmetrical shape with respect to the terminal 40, and includes a connecting portion 52, a bifurcated portion 54, a sandwiched portion 56, and a through-hole 58. The connecting portion 52 is located on one end side of the terminal 50 and is connected to the second end portion 34 in the longitudinal direction of the fuse-element 30. The bifurcated portion 54 is a portion obtained by bifurcating the other end side (tip side) of the terminal 50. The bifurcated portion 54 is exposed from the case member 10 and is connected to the circuit board. The sandwiched portion 56 is located at the center of the terminal 50 and sandwiched between the case member 10 and the lid member 20. Specifically, the sandwiched portion 56 is sandwiched between the upper surface 15*a* of the side wall 15 and the flat plate portion 21. As shown in FIG. 3, the through-hole 58 is a portion through which the other one of the pin parts 16 of the case member 10 is inserted. By inserting the pin part 16 through the through-hole 58, the fuse-element 30 connected to the terminal 50 is positioned with respect to the case member 10.

(Concerning Resin Materials for a Case Member and a Lid Member)

As described above, the case member 10 is made of phenol resin or unsaturated polyester resin, and the lid member 20 is made of phenol resin. Such selection of resin is based on evaluation results described below.

Figures 8, 9, 10:
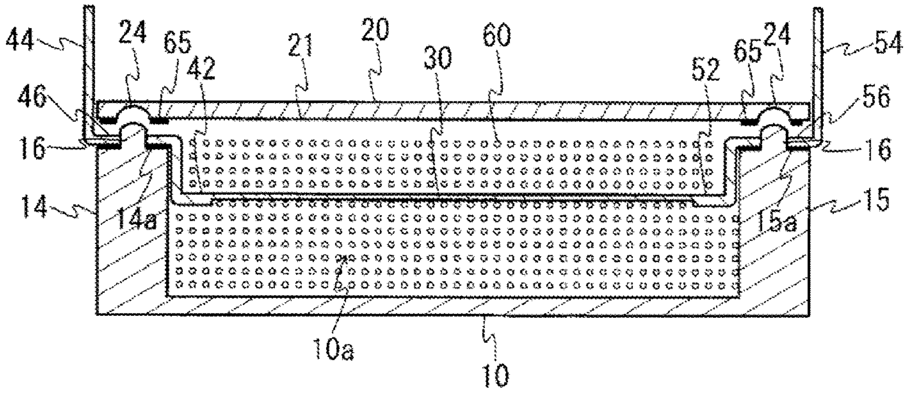
FIG. 8 illustrates a relationship between (i) resin forming the case member 10 and the lid member 20 and (ii) assemblability.
FIG. 9 illustrates a relationship between (i) resin forming the case member 10 and the lid member 20 and (ii) breaking performance.
FIG. 10 illustrates a configuration of a fuse 1 according to a second embodiment.

FIG. 8 illustrates a relationship between (i) resin forming the case member 10 and the lid member 20 and (ii) assemblability. Here, the assemblability is evaluated when the resin, which is a principal component of the case member 10 and the lid member 20, is liquid crystal polymer (LCP) resin, poly phenylene sulfide (PPS) resin, phenol resin, or unsaturated polyester resin.

A principal component of a trial part A1 of the case member 10 is LCP resin. A principal component of a trial part A2 is PPS resin. A principal component of a trial part A3 is phenol resin. A principal component of a trial part A4 is unsaturated polyester resin.

A principal component of a trial part B1 of the lid member 20 is LCP resin. A principal component of a trial part B2 is PPS resin. A principal component of a trial part B3 is phenol resin. A principal component of a trial part B4 is unsaturated polyester resin.

As shown in FIG. 8, the case member 10 has good assemblability in all cases of LCP resin, PPS resin, phenol resin, and unsaturated polyester resin. On the other hand, the lid member 20 has good assemblability in the case of LCP resin, PPS resin, and phenol resin, but has poor assemblability in the case of unsaturated polyester resin. This is because due to unsaturated polyester resin being a hard material, it is difficult to widen the contact walls 22 and 23 of the lid member 20, as shown in FIG. 7C. On the other hand, it is easy to widen the lid member 20 when it is made of LCP resin, PPS resin, or phenol resin because these materials have toughness.

FIG. 9 illustrates a relationship between (i) resin forming the case member 10 and the lid member 20 and (ii) breaking performance. Here, the breaking performance is evaluated when the resin which is a principal component of the case member 10 is LCP resin, PPS resin, phenol resin, or unsaturated polyester resin, and the resin which is a principal component of the lid member 20 is LCP resin, PPS resin, or phenol resin. Trial parts A1 to A4 and trial parts B1 to B3 are the same as the trial parts A1 to A4 and the trial parts B1 to B3 shown in FIG. 8.

As shown in FIG. 9, when the case member 10 is phenolic resin or unsaturated polyester resin and the lid member 20 is phenolic resin, the fuse-element 30 has good breaking performance. On the other hand, when resins of the case member 10 and the lid member 20 are a different combination, the breaking performance of the fuse-element 30 is poor. Based on the above, it is desirable that the case member 10 be made of phenol resin or unsaturated polyester resin and the lid member 20 be made of phenol resin in order to satisfy both assemblability and breaking performance in the case where the case member 10 and the lid member 20 in which the engaging projections 17 and 18 and the engagement recesses 27 and 28 engage with each other.

In the above description, the fuse-element 30 is formed integrally with the terminals 40 and 50, but is not limited to this. For example, the fuse-element 30 may be bonded to the terminals 40 and 50 by welding (for example, spot welding). That is, the first end portion 32 of the fuse-element 30 is welded to the connecting portion 42 of the terminal 40, and the second end portion 34 of the fuse-element 30 is welded to the connecting portion 52 of the terminal 50. Instead of welding, soldering may be used for bonding.

Effect of First Embodiment

In the fuse 1 of the first embodiment, the case member 10 has the plurality of engaging projections 17 formed on the side wall 12 that extends along the longitudinal direction, and the plurality of engaging projections 18 formed on the side wall 13 that opposes the side wall 12. Further, the lid member 20 that adheres to the case member 10 includes the plurality of engagement recesses 27 formed in the contact wall 22 in contact with the side wall 12 and fitted to each of the plurality of engaging projections 17, and a plurality of engagement recesses 28 formed in the contact wall 23 in contact with the side wall 13 and fitted to each of the plurality of engaging projections 18. Thus, even if the air pressure in the space 10*a* increases, the engaging projections 17 and 18 formed on the side walls 12 and 13 and the engagement recesses 27 and 28 formed on the contact walls 22 and 23 in contact with the side walls 12 and 13 can be maintained in a locked state, so that it is possible to prevent the lid member 20 from coming off the case member 10. In addition, since the space 10*a* becomes a sealed space, the breaking performance of the fuse-element 30 can be achieved in a compatible manner.

Second Embodiment

A fuse 1 according to a second embodiment will be described with reference to FIG. 10.

FIG. 10 illustrates a configuration of the fuse 1 according to the second embodiment. In the second embodiment, as shown in FIG. 10, an arc extinguishing material 60 is disposed around the fuse-element 30 in the space 10*a*. The arc extinguishing material 60 is sand, for example. By providing the arc extinguishing material 60, it is possible to prevent an occurrence of arc discharge.

In the second embodiment, adhesive 65 is applied to both ends in the longitudinal direction of the flat plate portion 21 of the lid member 20 in order to improve the sealing property of the space 10*a*. The adhesive 65 is applied to a portion of the flat plate portion 21 that sandwiches the terminal 40 (specifically, the sandwiched portion 46) with the side wall 14 (specifically, the upper surface 14*a*). Also, the adhesive 65 is applied to a portion of the flat plate portion 21 that sandwiches the terminal 50 (specifically, the sandwiched portion 56) with the side wall 15 (specifically, the upper surface 15*a*). By applying the adhesive 65 in this manner, leakage of the arc extinguishing material 60 can be prevented.

In the fuse 1 of the second embodiment, configurations other than the arc extinguishing material 60 and the adhesive 65 are the same as those of the fuse 1 of the first embodiment. Therefore, the fuse 1 of the second embodiment can also prevent the lid member 20 from coming off the case member 10.

Third Embodiment

A fuse 1 according to a third embodiment will be described with reference to FIG. 11.

Figure 11:
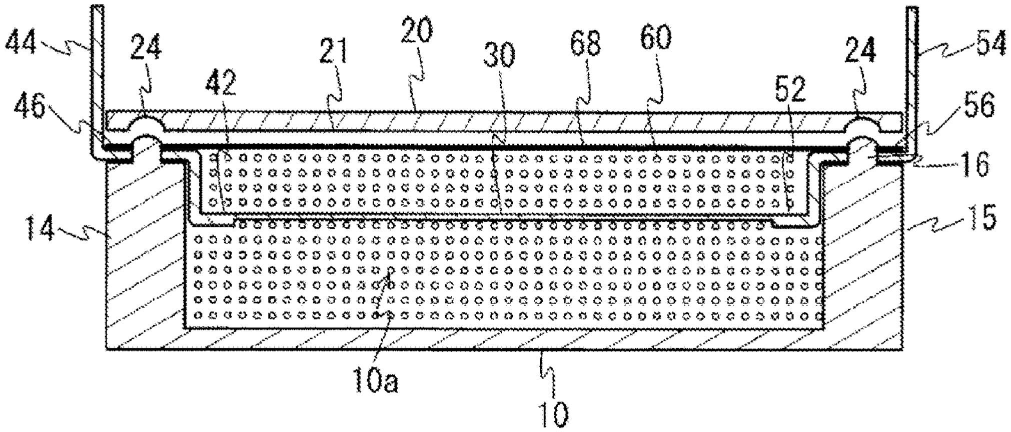
FIG. 11 illustrates a configuration of a fuse 1 according to a third embodiment.

FIG. 11 illustrates a configuration of the fuse 1 according to the third embodiment. In the third embodiment, the arc extinguishing material 60 is provided around the fuse-element 30 in the space 10*a*, as shown in FIG. 11. The arc extinguishing material 60 is sand, for example.

In addition, in the third embodiment, a film member 68 is disposed at both ends in the longitudinal direction of the flat plate portion 21 of the lid member 20 in order to improve the sealing property of the space 10*a*. The film member 68 is disposed between the flat plate portion 21 and the side wall 14 and between the flat plate portion 21 and the side wall 15. By providing the film member 68, leakage of the arc extinguishing material 60 can be prevented.

The film member 68 shown in FIG. 11 has the same width as the flat plate portion 21, but is not limited thereto. The film member 68 may be provided only around two recessed parts 24 in the flat plate portion 21. That is, the film member may be disposed only in the portion between the side wall 14 and the flat plate portion 21 and in the portion between the side wall 15 and the flat plate portion 21.

In the fuse 1 of the third embodiment, configurations other than the arc extinguishing material 60 and the film member 68 are the same as those of the fuse 1 of the first embodiment. Therefore, the fuse 1 of the third embodiment can also prevent the lid member 20 from coming off the case member 10.

Fourth Embodiment

A fuse 1 according to a fourth embodiment will be described with reference to FIG. 12.

Figure 12:
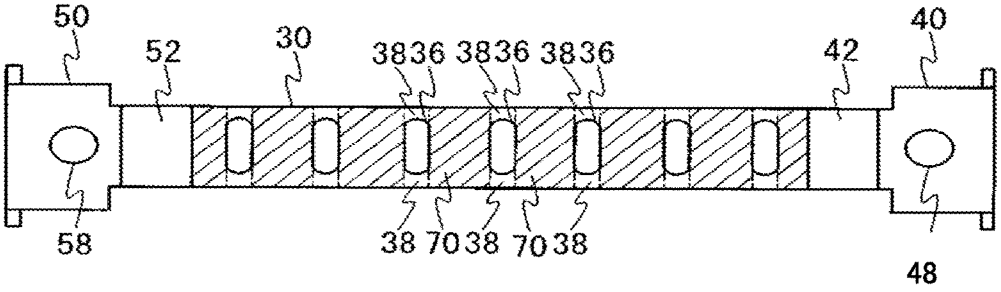
FIG. 12 illustrates a configuration of a fuse 1 according to a fourth embodiment.
Figure 12:
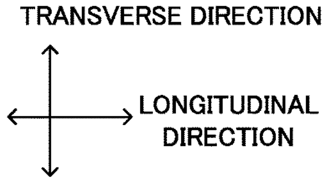

FIG. 12 illustrates a configuration of the fuse 1 according to the fourth embodiment. The fourth embodiment is different from the first to third embodiments in that an insulating adhesive 70 is applied to the fuse-element 30.

As shown in FIG. 12, the fuse-element 30 having a rectangular shape includes narrow portions 38. Here, the narrow portions 38 are portions at the ends of each hole 36 in the transverse direction of the fuse-element 30. Since the holes 36 are formed at predetermined intervals in the longitudinal direction of the fuse-element 30, the narrow portions 38 are also formed at predetermined intervals in the longitudinal direction. The width of each narrow portion 38 is smaller than the width of a portion between the adjacent holes 36 in the fuse-element 30.

In the fourth embodiment, the insulating adhesive 70 is applied to a plurality of locations on the fuse-element 30. The adhesive 70 is applied to portions of the fuse-element 30 other than the narrow portions 38. Specifically, the adhesive 70 is applied to portions (hatched areas in FIG. 12) between the adjacent holes 36 in the fuse-element 30. The portions to which the adhesive 70 is applied may be a part of the hatched areas in FIG. 12. In FIG. 12, the adhesive 70 is applied to an upper surface of the fuse-element 30, but is not limited thereto. The adhesive 70 may be applied to a lower surface of the fuse-element 30. The breaking performance of the fuse-element 30 can be improved by having the insulating adhesive 70 applied to the fuse-element 30.

In the above description, the narrow portions 38 are formed by having the holes 36 in the fuse-element 30, but the present embodiment is not limited to this. For example, the narrow portions 38 may be formed by providing notches at both ends of the fuse-element 30 in the transverse direction. In this case, the narrow portions 38 are located at the center in the transverse direction of the fuse-element 30. In the above description, one hole 36 is formed in the transverse direction of the fuse-element 30, but the present embodiment is not limited to this. For example, a plurality of holes 36 may be formed in the transverse direction of the fuse-element 30. In this case, three or more narrow portions 38 are formed in the transverse direction.

In the fuse 1 of the fourth embodiment, the configurations other than the adhesive 70 are the same as those of the fuse 1 of the first to third embodiments. Therefore, the fuse 1 of the fourth embodiment can also prevent the lid member 20 from coming off the case member 10.

The narrow portions 38 are formed in the fuse-element 30 in the fourth embodiment, but the present embodiment is not limited to this, and no narrow portion 38 need be formed in the fuse-element 30. By having the adhesive 70 applied to such a fuse-element 30, the breaking performance of the fuse-element 30 can be improved.

The present disclosure has been described above on the basis of the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present disclosure is obvious from the description of the claims.

What is claimed is:

1. A fuse comprising:

a case member that has a rectangular parallelepiped shape and has a space surrounded by a bottom portion and side walls;

a lid member that closes an upper opening of the case member and closely adheres to the case member;

a fuse-element disposed in the space; and a pair of terminals, whose distal ends are exposed to outside, connected to respective ends of the fuse-element, wherein the case member includes a plurality of first projections formed on a first side wall extending in a longitudinal direction, and a plurality of second projections formed on a second side wall that opposes the first side wall, the lid member includes a plurality of first recesses formed in a first contact wall in contact with the first side wall and fitted respectively to the plurality of first projections, and a plurality of second recesses formed in a second contact wall in contact with the second side wall and fitted respectively to the plurality of second projections, distal end portions of the first contact wall and the second contact wall of the lid member bend outward while contacting the first projections and the second projections at the time of mounting the lid member to the case member, the case member has four corner recesses that are formed by having four corners of the case member recessed, and the lid member has four restricting parts that regulate positional deviation in the longitudinal direction of the first contact wall and the second contact wall and are guided by each of the corner recesses at the time of being mounted to the case member while bending, the restricting parts being disposed at respective ends of the first contact wall and the second contact wall, engageably with the corner recesses.

2. The fuse according to claim 1, wherein the first contact wall is in surface contact with the first side wall and covers the entire first side wall, and the second contact wall is in surface contact with the second side wall and covers the entire second side wall.

3. The fuse according to claim 1, wherein the first projections are formed in the first side wall, at both ends in a longitudinal direction and on a bottom portion side, and the second projections are formed in the second side wall, at both ends in the longitudinal direction and on the bottom portion side.

4. The fuse according to claim 1, wherein the first recesses are through-hole portions passing through the first contact wall, and the second recesses are through-hole portions passing through the second contact wall.

5. The fuse according to claim 1, wherein the first projections each have an inclined portion whose height increases toward the bottom portion, and the second projections each have an inclined portion whose height increases toward the bottom portion.

6. The fuse according to claim 1, wherein the case member is made of phenol resin or unsaturated polyester resin, and the lid member is made of phenol resin.

7. The fuse according to claim 1, wherein the first contact wall and the second contact wall are walls that are bent from a flat plate portion which closes the upper opening of the lid member, the case member has a third side wall and a fourth side wall orthogonal to the first side wall and the second side wall, and the terminals are sandwiched between (i) upper surfaces of the third side wall and the fourth side wall and (ii) the flat plate portion.

8. The fuse according to claim 7, wherein an arc extinguishing material is disposed around the fuse-element in the space, and an adhesive is applied to a portion of the flat plate portion that sandwiches each of the terminals with the third side wall and the fourth side wall, respectively.

9. The fuse according to claim 7, wherein an arc extinguishing material is disposed around the fuse-element in the space, and the fuse further comprises a film member disposed between (i) the flat plate portion and (ii) the third side wall and the fourth side wall.

10. The fuse according to claim 1, wherein the fuse-element having a rectangular shape includes a plurality of narrow portions formed at predetermined intervals in a longitudinal direction, and an insulating adhesive is applied to a portion of the fuse-element other than the narrow portions.

11. The fuse according to claim 1, wherein the fuse-element and the terminals are integrally molded.

* * * * *